United States Patent [19]
Gorby

[11] 4,435,996
[45] Mar. 13, 1984

[54] DIFFERENTIAL ASSEMBLY FOR VEHICLES

[75] Inventor: Oliver L. Gorby, Fargo, N. Dak.

[73] Assignee: Agri-Tech Ltd., Inc., Barnesville, Minn.

[21] Appl. No.: 104,515

[22] Filed: Dec. 17, 1979

[51] Int. Cl.³ .............................................. F16H 1/40
[52] U.S. Cl. ............................................ 74/713; 74/710
[58] Field of Search ............................ 74/710, 713, 607

[56] References Cited

U.S. PATENT DOCUMENTS

| | | | |
|---|---|---|---|
| 373,850 | 11/1887 | Pope | 74/713 |
| 753,022 | 2/1904 | White | 74/713 |
| 1,290,111 | 1/1919 | Deckert | 74/713 |
| 1,400,949 | 12/1921 | Frey | 74/713 |
| 1,610,958 | 12/1926 | Leister | 74/713 |
| 1,874,646 | 8/1932 | Skinner | 74/713 |
| 1,895,384 | 1/1933 | Lorimor | 74/713 |
| 2,245,078 | 6/1941 | Padgett | 74/607 |
| 2,603,108 | 7/1952 | Carlson | 74/710 |
| 3,385,133 | 5/1968 | Terao | 74/713 |
| 4,224,839 | 9/1980 | Von Kaler | 74/713 |

Primary Examiner—Leslie A. Braun
Assistant Examiner—D. Wright
Attorney, Agent, or Firm—Williamson, Bains, Moore & Hansen

[57] ABSTRACT

A differential for vehicles comprising a differential carrier directly supported within a housing on the inner ends of a pair of axle shafts. A ring gear is mounted on the carrier; and one of the axle tubes in which the axle shafts are rotatably supported positions the carrier within the housing and takes the ring gear thrust load imparted thereto by a pinion gear on a drive shaft.

3 Claims, 4 Drawing Figures

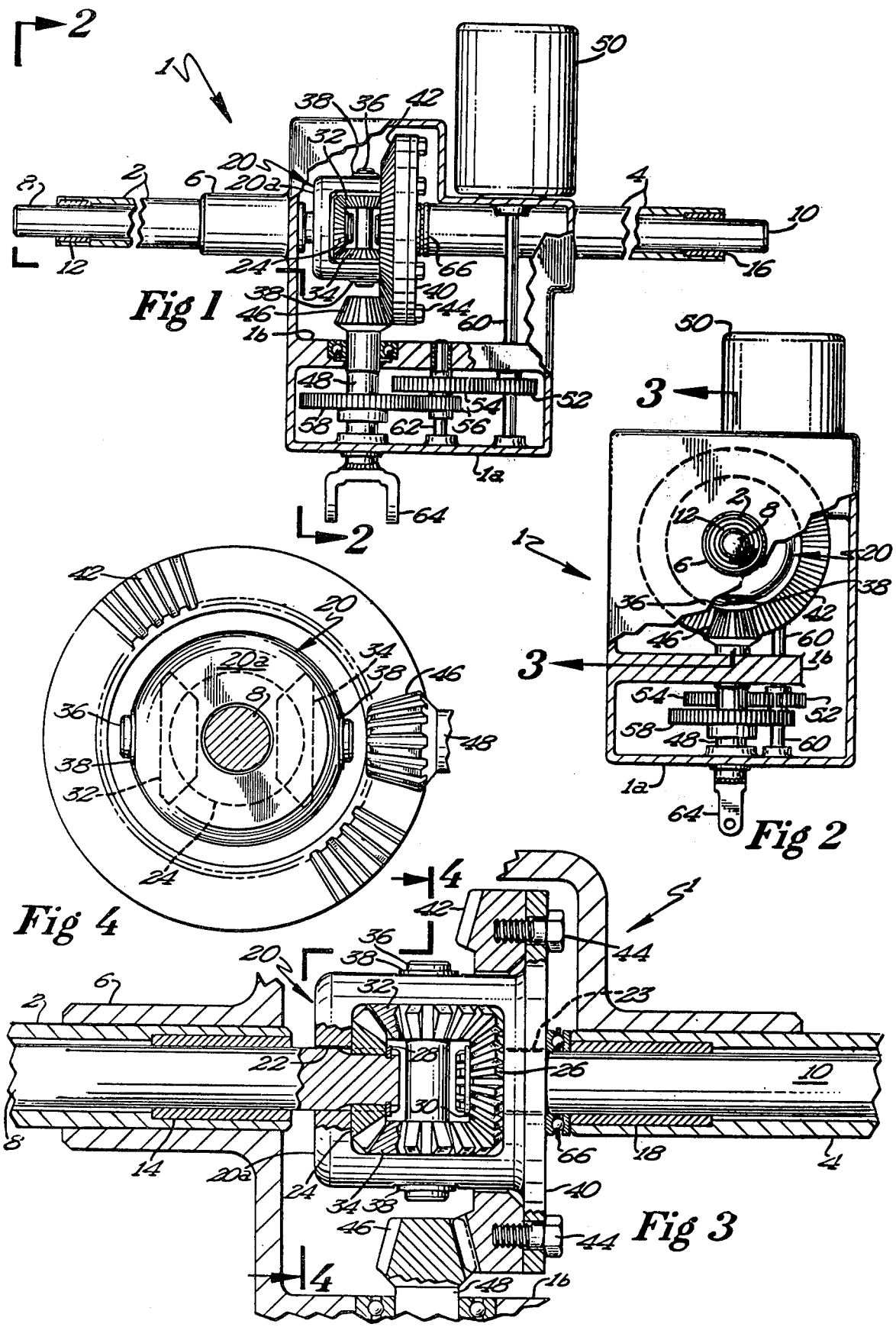

DIFFERENTIAL ASSEMBLY FOR VEHICLES

BACKGROUND OF THE INVENTION

Traditionally, differential assemblies have incorporated a differential carrier which has been utilized to rotatably support differential bevel gears. It has been the most common practice to support the differential carrier by bearings mounted in the differential housing. This is expensive and unduly increases the size of the differential assembly. The carrier is normally rotated by a ring gear driven by a pinion gear on an input shaft; and the aforesaid carrier support bearings also normally serve to position the carrier in its housing and to take the ring gear thrust load.

U.S. Pat. No. 3,191,447 discloses an axle drive assembly incorporating a transmission and a differential drive in a common housing. A bull gear driven by the transmission is supported on the axle shafts, and serves as a differential carrier. This arrangement represents an improvement over traditional differential assemblies to the extent that separate bearings are not utilized to support the differential carrier within its housing. However, the prior art is lacking as to a compact and effective means for supporting a differential carrier, driven by a ring gear, within a housing in such a way that the carrier is properly supported and positioned.

SUMMARY OF THE INVENTION

This invention is directed to an improved differential assembly for vehicles which provides for the simple and compact support and positioning of a differential gear carrier, while effectively absorbing the thrust load imparted to a ring gear driving the carrier.

These basic objectives are realized by a differential drive arrangement wherein sleeve bearings in axle tubes support the axles and a differential gear carrier is supported directly on the axle shafts at their inner ends, inside of a housing.

In a preferred form of the invention, the aforesaid differential carrier is of elongated, cylindrical shape and is positioned with its longitudinal axis substantially coextensive with the longitudinal axes of a pair of aligned axles. The differential carrier has aligned apertures in the opposite sides thereof through which the inner ends of the axles extend for supporting the carrier. A ring gear is mounted on one end of the cylindrical carrier, and is driven by a pinion gear affixed to a power input shaft.

As a particularly advantageous feature of the invention, one of the aforesaid axle tubes extends within the differential housing and serves to position the differential carrier within the housing, as well as to take the thrust load imparted to the ring gear by the pinion gear. This is preferably accomplished by a thrust bearing positioned on the inner end of one of the axle shafts between the inner end of its axle tube and one side of the differential carrier.

These and other objects and advantages of my invention will become readily apparent as the following description is read in conjunction with the accompanying drawings wherein like reference numerals have been used to designate like elements throughout the several views.

BRIEF DESCRIPTION OF THE DRAWINGS

FIG. 1 is a top, plan view of the differential assembly of this invention, with portions thereof cut away for clarity;

FIG. 2 is an elevation view of the differential assembly of FIG. 1, taken along lines 2—2 and with portions thereof broken away;

FIG. 3 is a horizontal section view of the differential assembly taken along lines 3—3 of FIG. 2; and FIG. 4 is a fragmentary, vertical section view taken along lines 4—4 of FIG. 1 and showing the differential carrier.

DESCRIPTION OF THE PREFERRED EMBODIMENT

With reference to the drawings, a housing containing the improved differential assembly of this invention is generally indicated by reference numeral 1. It is contemplated that the differential drive arrangement disclosed herein may be utilized for driving the axles of any vehicle. To that end a pair of axle tubes 2 and 4 are secured to opposite sides of housing 1 in alignment with each other. Housing 1 is formed on one side to provide a sleeve 6 within which axle tube 2 is received in a press fit. Axle tube 4 passes through a bore in the opposite side of the housing and is affixed thereto, as by welding. Axles 8 and 10 are rotatably supported within axle tubes 2 and 4. This is preferably accomplished in the approved embodiment of my differential assembly by utilizing a pair of sleeve bearings at longitudinally spaced points along the length of each of the axle tubes 2 and 4. Sleeve bearings 12 and 14 at the inner and outer ends of axle tube 2 rotatably support axle 8 as shown in FIGS. 1 and 3. In like manner, sleeve bearings 16 and 18 rotatably support axle 10 within axle tube 4. Sleeve bearings 14 and 18 are advantageously positioned adjacent the inner ends of axles 8 and 10. With the inner end extremities of the axles extending a predetermined distance within housing 1, this bearing arrangement assures proper support for the axles, and also permits the inner ends of the axles to properly provide support for a differential carrier 20 as hereinafter set forth.

Differential carrier 20 is preferably cast as an elongated, cylindrical member as shown. A central cavity 21 formed therein provides a space for four intermeshing differential bevel gears. Aligned apertures 22 and 23 are formed in opposite sides of carrier 20 and the inner ends of axles 8 and 10 extend therethrough into the interior of carrier 20 as shown most clearly in FIGS. 1 and 3. The longitudinal axis of differential carrier 20 is substantially coextensive with the aligned longitudinal axes of axles 8 and 10. It will thus be seen that carrier 20 is supported directly and completely on the inner ends of axles 8 and 10. The central location of aperture 22 in carrier side wall 20a to receive axle 8 is shown in FIG. 4.

A first pair of differential bevel gears 24 and 26 are affixed to the inner ends of axles 8 and 10 within interior cavity 21 of carrier 20. Spline connections as shown in FIG. 3 are preferably used between differential bevel gears 24 and 26 and the inner ends of axles 8 and 10, slip rings 28 and 30 serving to retain gears 24 and 26 in place. A second set of differential bevel gears 32 and 34 is provided within the interior of carrier 20 in meshing engagement with bevel gears 24 and 26, as shown. Bevel gears 32 and 34 are rotatably mounted on a carrier pin 36 which extends through the opposite side walls of carrier 20 and is held in place therein by lock rings 38.

A flange ring 40 is cast integrally with carrier 20 on one end thereof; and ring gear 42 is affixed to flange ring 40 by threaded fasteners 44. Carrier 20 will thus rotate with ring gear 42. Ring gear 42 is driven by a pinion gear 46 formed on one end of a drive or power input shaft 48.

Drive shaft 48 is driven from a power source through a transmission. Various types and locations of transmissions may be used, depending upon the type of vehicle on which the differential assembly is to be used. One application is on 4-wheel drive, articulated loaders of the type disclosed in U.S. Pat. No. 3,915,321. On such a vehicle, a gear reduction transmission may be positioned at either the front or rear axle. In the embodiment disclosed herein, axles 8 and 10 would comprise the front axles of the vehicle with an hydrostatic motor 50 driven from the vehicle engine by a fluid pump serving to provide input power to the gear reduction drive. The gear reduction drive transmission is advantageously mounted inside of differential housing 1 in a compact arrangement with the differential drive assembly. The gear reduction drive is comprised of a first and second set of speed reduction gears 52, 54 and 56, 58. Drive pinion gear 52 is mounted on power output shaft 60 from hydrostatic motor 50. Gears 54 and 56 of the transmission are mounted on shaft 62 rotatably supported by housing end wall 1a and intermediate wall 1b extending transversely within housing 1 as shown in FIGS. 1 and 2. Drive shaft 48 is also rotatably supported in bearings in the same housing walls 1a and 1b as shown; and final, speed reduction gear 58 is affixed to drive shaft 48.

For the purpose of supplying driving power to the rear axle of an articulated loader vehicle of the type disclosed in U.S. Pat. No. 3,915,321, a yoke 64 is provided on the free, rear end of drive shaft 48. This yoke forms a part of a universal joint to which a rearwardly extending drive shaft is coupled for the purpose of providing power to the input, pinion shaft of a differential assembly on the rear axle. On such vehicles, there would be no separate transmission or gear reduction drive at the rear axle. All of the speed reduction from hydrostatic motor 50 is accomplished through the gear reduction drive mounted within the differential housing 1 on the front axle assembly.

It will be understood that drive pinion 46 will impart a thrust load to ring gear 42 in a direction extending towards and along the length of axle tube 4 and axle 10. This thrust load is advantageously handled in a simple and effective manner by providing a thrust bearing 66 at the inner end of axle tube 4 as shown most clearly in FIG. 3. Thurst bearing 66 is mounted on axle 10, and positioned as shown between the inner end of axle tube 4 and flange ring 40 at one side of differential carrier 20. In assembling the differential, axle tube 4 is first press fitted into differential housing 1 so that its inner end will extend thereinto a predetermined distance. Axle tube 4 is then fixed in place within the housing, as by welding. Axle 10 is then slidably inserted through axle tube 4, and thrust bearing 66 is then positioned on the inner end of axle 10 against the inner end of axle tube 4. After the other axle tube 2 is press fitted into the opposite side of housing 1, axle 8 is slidably inserted therethrough. Differential carrier 20 is placed inside of housing 1, and the inner ends of axles 8 and 10 are inserted through aligned apertures 22 and 23 in the opposite sides of carrier 20 to the positions shown within carrier cavity 21. Flange ring 40 of differential carrier 20 is then abutted up against trust bearing 66. This serves to properly position carrier 20 within the differential housing prior to affixing differential bevel gears 24 and 26 to the inner ends of axles 8 and 10. It will thus be seen that axle tube 4 serves the dual functions of properly positioning differential carrier 20 and ring gear 42 within the differential housing and taking the thrust load imparted to ring gear 42 by drive pinion 46.

As noted above, differential carrier 20 is supported in its entirety on the inner ends of axles 8 and 10. It will be understood that when differential bevel gears 24, 26 and 32, 34 are performing a differential function when the vehicle is turning there will be relative rotational movement between axles 8 and 10 and differential carrier 20. The support surfaces of axles 8 and 10 thus also serve as bearing surfaces along the portions thereof extending through aligned apertures 22 and 23 in the opposite sides of carrier 20. To this end, axles 8 and 10 are made of ground polished steel. The positioning of inner bearing sleeves 14 and 18 for axles 8 and 10 adjacent the side walls of housing 1 as shown also lends additional support to the axles, and for the bearing support of carrier 20.

It is contemplated that various changes can be made in the size, shape and construction of the differential and transmission assembly disclosed herein without departing from the spirit and scope of the invention as defined by the following claims:

What is claimed is:

1. A differential for vehicles comprising:
    a differential housing;
    a pair of axle tubes affixed to opposite sides of said housing;
    a pair of axles positioned longitudinally within said axle tubes with their inner ends extending into said housing;
    a differential carrier in the form of a walled enclosure defining a central cavity, said carrier being positioned within said housing and directly and completely supported on the inner ends of said axles at axially aligned apertures in opposite side walls of said carrier enclosure through which the inner ends of said axles extend into said central cavity, the portions of said inner ends of said axles extending through said apertures being bearing surfaces on which said differential carrier is directly rotatably supported;
    intermeshing, differential gears mounted on said carrier and said axles within said central cavity, two side gears of said intermeshing gears being affixed to said inner ends of said axles entirely within said central cavity, said side gears and all portions thereof being completely contained inside of the walled enclosure of said differential carrier within said central cavity;
    a ring gear mounted on said differential carrier for rotation therewith;
    a pinion gear in meshing engagement with said ring gear, said pinion gear being affixed to a power input shaft; and
    bearing means comprising a pair of bearings positioned at longitudinally spaced locations in each of said axle tubes and directly, rotatably supporting said axles therein, one of said bearings of each pair of bearings being located adjacent to a side wall of said housing in laterally spaced relation to said differential carrier enclosure and said differential gears to directly rotatably support said inner ends of said axles, whereby said axle inner ends are able to provide proper bearing support for said differential carrier;

one of said axle tubes is laterally adjusted so that its inner end projects a predetermined distance inside of said housing;

thrust bearing means positioned between the inner end of said one axle tube and one side of said differential carrier, whereby said one axle tube serves to position said differential carrier within said housing and to take the ring gear thrust load imparted thereto by said pinion gear;

one side wall of said differential carrier enclosure terminates laterally inwardly from one of said side walls of said housing, defining an open space therebetween having no bearings or support members therein;

the opposite side wall of said differential carrier enclosure is affixed to said ring gear for rotation therewith; and said opposite side wall of said differential carrier enclosure bears against said thrust bearing and is laterally positioned by said inner end of said one axle tube, whereby no close machine tolerances are required on said differential carrier enclosure or on said housing for the accurate lateral positioning of said carrier enclosure within said housing.

2. A differential as defined in claim 1 wherein:
said thrust bearing means comprises a thrust bearing mounted on the inner end of the axle positioned within said one axle tube.

3. A differential as defined in claim 1, and further including:
a gear reduction drive disposed within said housing in driving relation to said power input shaft; and
power means drivingly connected to said gear reduction drive.

* * * * *